(12) United States Patent
Cheng et al.

(10) Patent No.: US 7,760,420 B2
(45) Date of Patent: Jul. 20, 2010

(54) COLOR ELECTROWETTING DISPLAY (EWD) DEVICES

(75) Inventors: Wei-Yuan Cheng, Taipei County (TW); Chieh-Yi Huang, Hsinchu County (TW); Kuo-Chang Lee, Pingtung County (TW); Kuo-Lung Lo, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 22 days.

(21) Appl. No.: 12/392,850

(22) Filed: Feb. 25, 2009

(65) Prior Publication Data

US 2010/0128341 A1 May 27, 2010

(30) Foreign Application Priority Data

Nov. 21, 2008 (TW) .............................. 97145087 A

(51) Int. Cl.
*G02B 26/00* (2006.01)
*G02B 26/02* (2006.01)
(52) U.S. Cl. ....................................... 359/297; 359/228
(58) Field of Classification Search ................ 359/228, 359/290, 291, 292, 297
See application file for complete search history.

(56) References Cited

U.S. PATENT DOCUMENTS

| 6,967,763 | B2 | 11/2005 | Fujii et al. | |
|---|---|---|---|---|
| 7,310,080 | B2 * | 12/2007 | Jessop | 345/89 |
| 2009/0040591 | A1 * | 2/2009 | Cheng et al. | 359/290 |
| 2009/0103159 | A1 * | 4/2009 | Cheng et al. | 359/228 |
| 2009/0168144 | A1 * | 7/2009 | Lo et al. | 359/290 |
| 2009/0169806 | A1 * | 7/2009 | Lo et al. | 428/119 |

FOREIGN PATENT DOCUMENTS

WO        WO 03/071347 A1    8/2003

* cited by examiner

*Primary Examiner*—David N Spector
(74) *Attorney, Agent, or Firm*—Quintero Law Office

(57) ABSTRACT

Electrowetting display devices are presented. The electrowetting display includes a first substrate and an opposing second substrate with a polar fluid layer and a color non-polar fluid layer interposed therebetween. A first transparent electrode is disposed on the first substrate. A second electrode is disposed on the second substrate. A hydrophilic partition structure is disposed on the second substrate, thereby defining a plurality of sub-pixels. The color electrowetting display further includes an array of color pixel regions. Each pixel region consists of a set of primary color sub-pixel. Each color sub-pixel corresponds to one of different color non-polar fluid layers, and each of the different color non-polar fluid layers is isolated from each other. The colors of non-polar fluid layer in the neighboring sub-pixels are different.

32 Claims, 12 Drawing Sheets

COLOR ELECTROWETTING DISPLAY (EWD) DEVICES

CROSS REFERENCE TO RELATED APPLICATIONS

This application is based upon and claims the benefit of priority from a prior Taiwanese Patent Application No. 097145087, filed on Nov. 21, 2008, the entire contents of which are incorporated herein by reference.

BACKGROUND OF THE INVENTION

1. Field of the Invention

The invention relates to display devices, and in particular to color electrowetting display devices.

2. Description of the Related Art

Electrowetting display devices are rendered images in accordance with electrowetting or electrocapillary. Briefly, the free surface energy of some fluids is changed due to electric field effects such that distribution area of the fluids can thus change along with the electric field effects.

U.S. Pat. No. 6,967,763, the entirety of which is hereby incorporated by reference, discloses an electrowetting display device. An opaque non-polar fluid in the electrowetting display device converges due to electrowetting effect, thereby controlling a bright state and/or a dark state of a pixel.

FIGS. 1A and 1B are cross sections respectively illustrating a voltage off-state and a voltage on-state for a conventional electrowetting display. Referring to FIG. 1A, a conventional electrowetting display 10 includes a substrate 11 with a patterned pixel electrode 12 disposed thereon. A dielectric layer 13 having a hydrophobic surface is disposed on the patterned pixel electrode 12. Patterned hydrophilic bank structures 14 are disposed on the dielectric layer 13, thereby defining each of pixel regions. An opaque non-polar fluid 15a containing a black dye and transparent polar fluid 16 are disposed in each pixel region. When the applied voltage is "off", the opaque non-polar fluid 15a uniformly distributes in a pixel region, thereby rendering the pixel region to display a dark state.

On the contrary, when the applied voltage is "on", the transparent polar fluid 16 is affected by electrowetting force to approach the pixel electrode and the opaque non-polar fluid 15b is converged far away from the pixel electrodes 12. A large portion of the pixel region is thus exposed, thereby rendering the pixel region to display a bright state, as shown in FIG. 1B.

FIG. 2 is a cross section schematically illustrating a conventional single-layered color electrowetting display device. In FIG. 2, a single-layered color electrowetting display device 50 includes a first substrate 51 and a second substrate 61 opposing to each other. The first substrate 51 includes patterned electrodes 52 corresponding to each of sub-pixel regions. A reflective layer 53 is disposed on the patterned electrode 52. A partition structure 54 is disposed on the reflective layer 53, thereby defining an array of sub-pixels. A black-dye containing first fluid 55 is disposed on the patterned electrodes 52 in each of the sub-pixels. A transparent second fluid 56 is filled between the first substrate 51 and the second substrate 61. A color filter 62 including red 62R, green 62G, and blue 62B color units is disposed on the second substrate 61. Each of the red 62R, green 62G, and blue 62B color units is corresponding to a sub-pixel region. A seal structure 70 is formed on the peripheral region of the display device encapsulating the first substrate 51 and the second substrate 61. A common electrode 65 contacts the second fluid 50. The surface tension of the first fluid 55 and the second fluid 50 are changed due to electrical field generated between the common electrode 65 and electrodes 52 in each sub-pixel region, thereby rendering display images. Specifically, whether the ambient light passing through the display device is reflected or absorbed is depended from shrink or stretch of the black non-polar fluid. The reflective light passing through the color filter on the first substrate is converted into desirable color of light to achieve full color display.

WO 2003/071347, the entirety of which is hereby incorporated by reference, discloses a color electrowetting display structure. FIG. 3 is a cross section of a tri-layered color electrowetting display device. Referring to FIG. 3, in the structure of the tri-layered color electrowetting display device 100, a partition structure 113 defined a plurality of sub-pixel structures between the upper and lower substrate. Polar fluid 106 and corresponding two different color non-polar ink oils 105W, 105C, 105Y, and 105M are filled into each sub-pixel structure, wherein a polar fluid is sandwiched between two non-polar ink oils such that a tri-layered structure consisting of ink oil, polar fluid and ink oil is presented between the upper and lower substrates. A color filter 121 is disposed on the upper substrate. The color filter has a complementary color with the other two different colors of the non-polar ink oils. During operation, different bias are respectively applied on electrodes 112 and 132-137, and whether the different non-polar ink oils are shrink or stretch can affect incident light 116 by the reflective plate 122 or is absorbed by different color non-polar ink oils 105W, 105C, 105Y, and 105M. The reflected light pass through color units 121M, 121C, and 212Y of the color filter thereby rendering desirable light colors.

The conventional single-layered color electrowetting display structure, however, uses color filter associated with black non-polar fluid (such as ink oil). Part of incident light is absorbed by the color filter resulting in lower color efficiency and saturation. Contrast ratio and brightness of the display images are also reduced. In addition, alignment between the color filter substrate and the lower substrate is so difficult that fabrication complexity of the display device is also increased. On the other hand, although conventional tri-layered color electrowetting display device can effectively improve color saturation, the display structure is complex, fabrication processes are tedious, and production cost is very high.

BRIEF SUMMARY OF THE INVENTION

Embodiments of the invention provide a color electrowetting display device, comprising: a first substrate and an opposing second substrate with a polar fluid layer and a color non-polar fluid layer interposed therebetween; a first transparent electrode disposed on the first substrate; a second electrode disposed on the second substrate; and a hydrophilic partition structure disposed on the second substrate, thereby defining a plurality of sub-pixels; wherein the color electrowetting display further includes an array of color pixel regions, each pixel region consisting of a set of primary color sub-pixels, wherein each color sub-pixel corresponds to one of different color non-polar fluid layers, and each of the different color non-polar fluid layers is isolated from each other, and wherein the colors of non-polar fluid layer in the neighboring sub-pixels are different.

Embodiments of the invention also provide a color electrowetting display device, comprising: a first substrate and an opposing second substrate with a polar fluid layer and a color non-polar fluid layer interposed therebetween; a first transparent electrode disposed on the first substrate; a second electrode disposed on the second substrate; and a hydrophilic partition structure disposed on the second substrate, thereby defining a plurality of sub-pixels; wherein the color electrowetting display further includes an array of color pixel regions, each pixel region consisting of a black sub-pixel and a set of primary color sub-pixels, wherein each color sub-pixel corresponds to one of different color non-polar fluid layers, and each of the different color non-polar fluid layers is isolated from each other, and wherein the colors of non-polar fluid layer in the neighboring sub-pixels are different.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
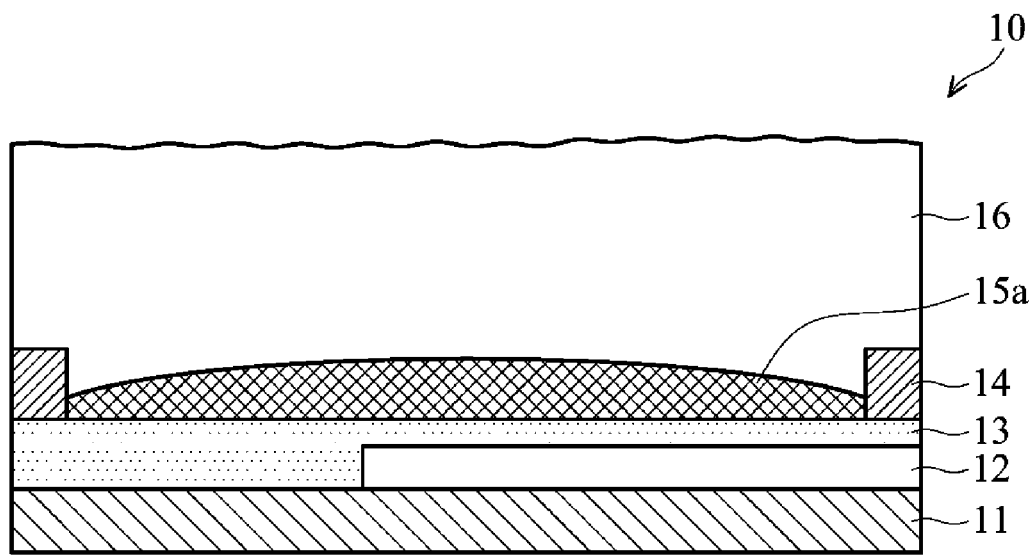
FIGS. 1A and 1B are cross sections respectively illustrating a voltage off-state and a voltage on-state for a conventional electrowetting display.
Figure 1B:
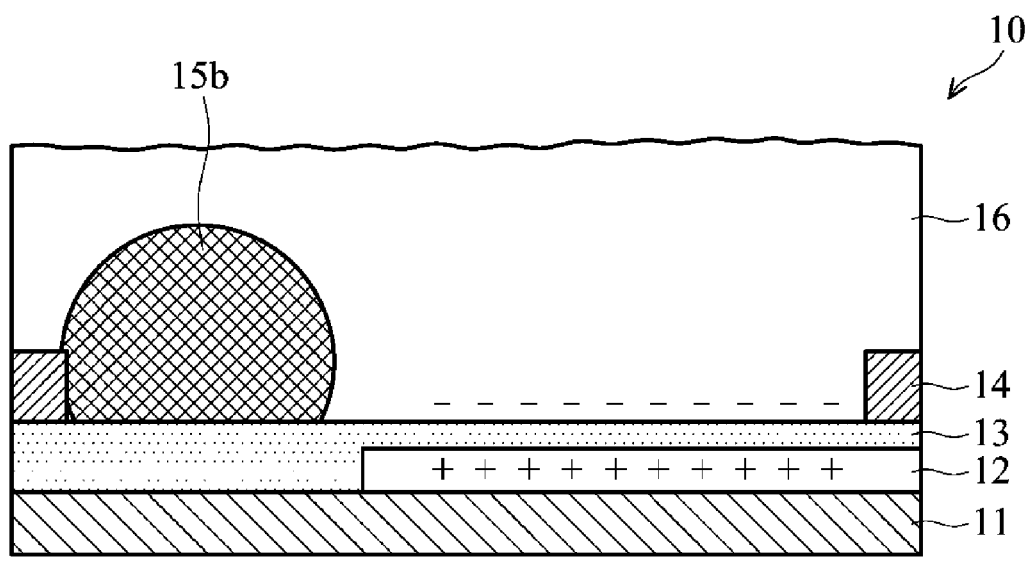
Figure 2:
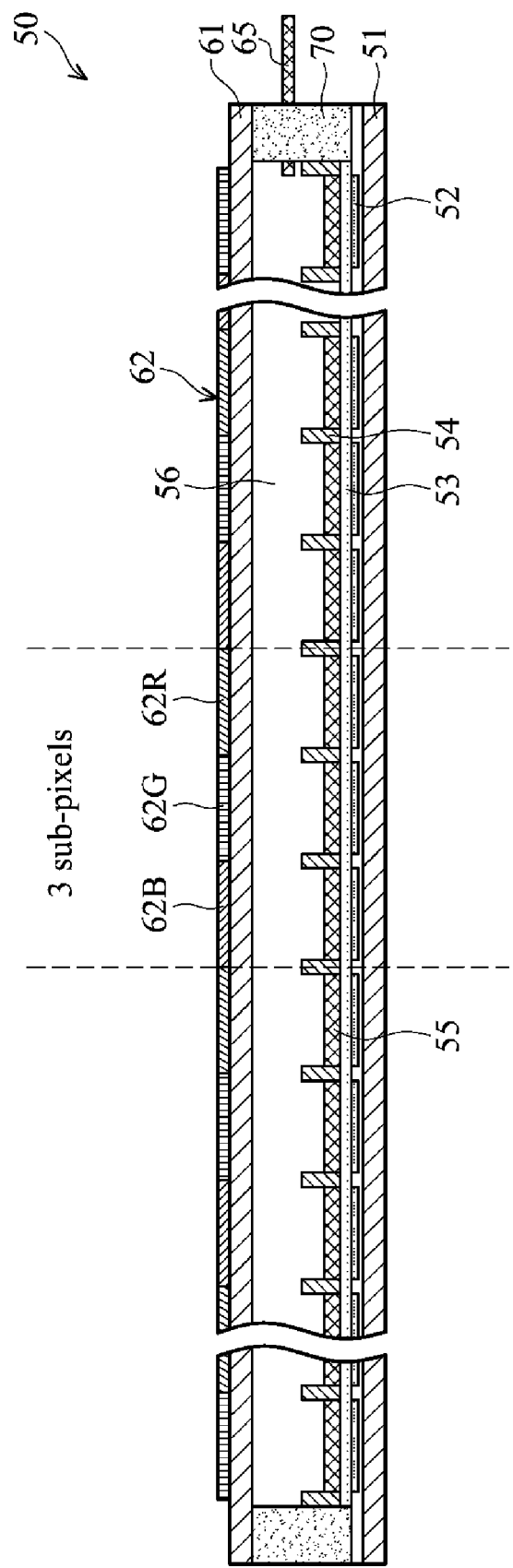
FIG. 2 is a cross section schematically illustrating a conventional single-layered color electrowetting display device.
Figure 3:
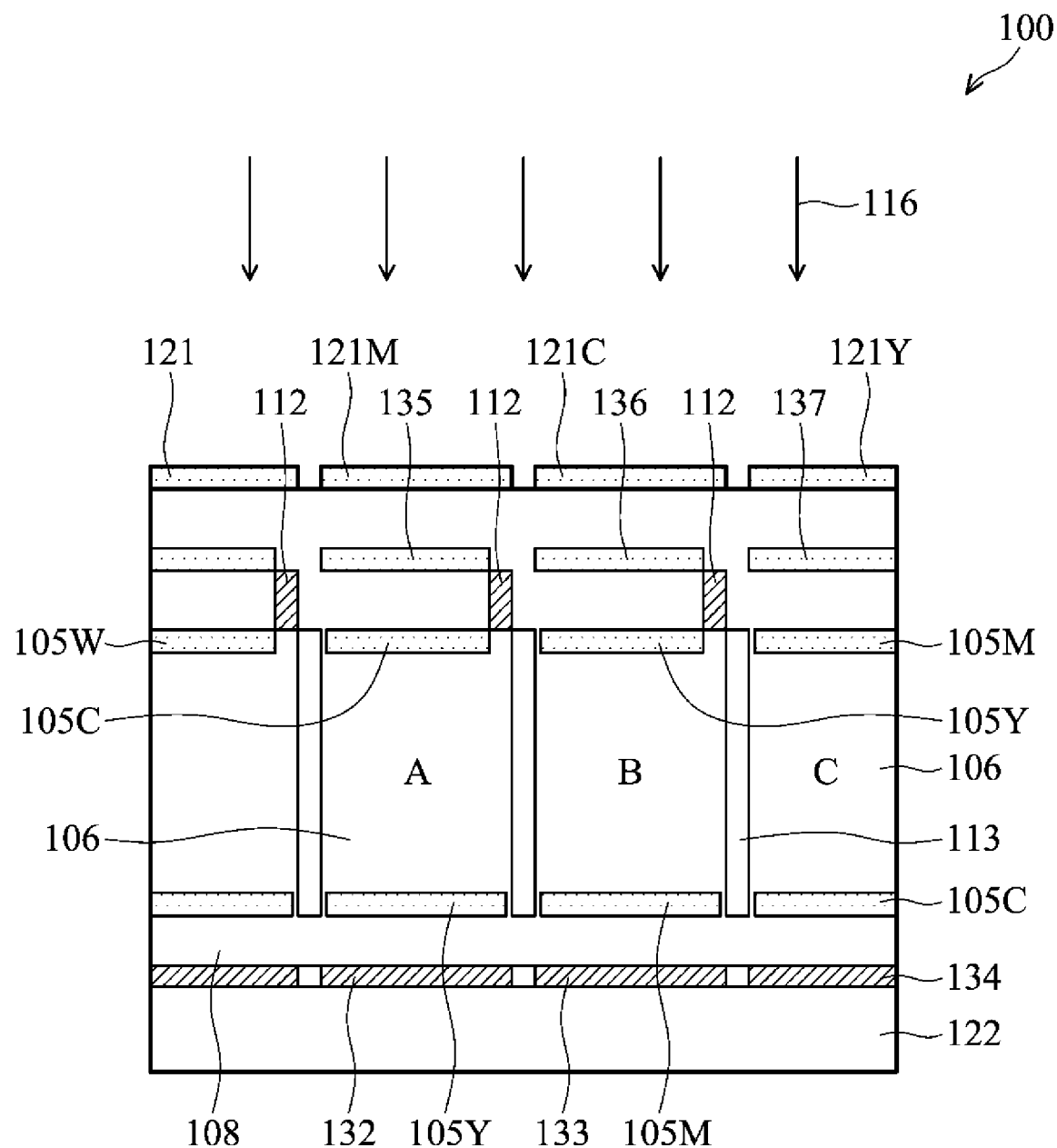
FIG. 3 is a cross section of a tri-layered color electrowetting display device.

It is to be understood that the following disclosure provides many different embodiments, or examples, for implementing different features of various embodiments. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself indicate a relationship between the various embodiments and/or configurations discussed. Moreover, the formation of a first feature over or on a second feature in the description that follows may include embodiments in which the first and second features are formed in direct contact or not in direct contact.

Embodiments of the invention are directed to electrowetting display devices which display mechanism is achieved by electrically changing surface characteristics of polar fluid in each pixel region. More specifically, novel geometric areas and arrangements of the color sub-pixels of the color electrowetting display device are provided to improve image quality and to reduce fabrication complexity and production cost of the color electrowetting display device.

Figure 4:
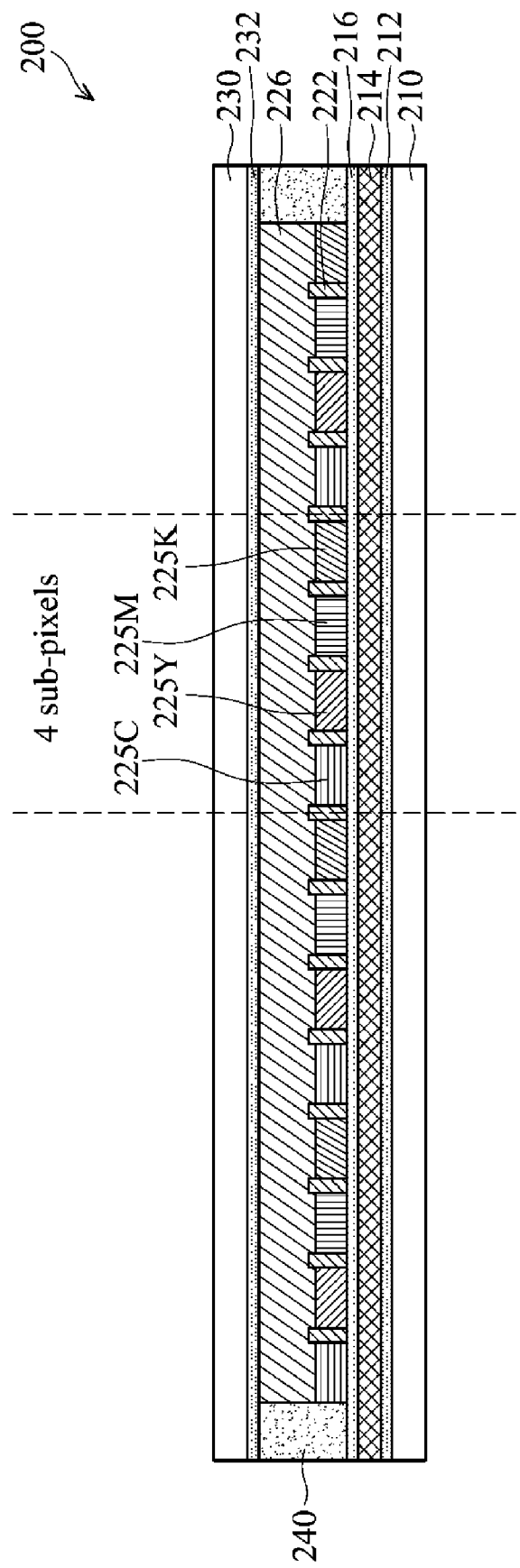
FIG. 4 is a cross section illustrating an embodiment of a single-layered color electrowetting display device of the invention.

FIG. 4 is a cross section illustrating an embodiment of a single-layered color electrowetting display device of the invention. Referring to FIG. 4, a single-layered color electrowetting display device 200 includes a first substrate (upper substrate) 230 and a lower substrate (lower substrate) 210 opposing to each other. The second substrate 210 includes patterned pixel electrodes 212 corresponding to each of sub-pixel regions. The pixel electrodes 212 can be made of indium tin oxide (ITO) or indium zinc oxide (IZO) with a thickness approximately in a range between 0.1 μm and 1 μm. The geometric structure of the pixel electrodes 212 can be a rectangular, a square, a triangle, a circle, a trapezoid, or an ellipse. According to another embodiment of the invention, a reflective layer is selectively disposed on the second substrate 210, or alternatively interposed between the transparent pixel electrode 212 and the second substrate 210. The reflective layer can be made of aluminum, titanium dioxide, or zirconium dioxide.

A dielectric layer 214 is disposed on the patterned pixel electrode 212. According to one embodiment of the invention, the dielectric layer is made of parylene, $SiO_x$, $SiN_x$, poly(vinyldiene fluoride), $TiO_2$, or $ZrO_2$, with a thickness approximately in a range between 0.1 μm and 1 μm. Moreover, a hydrophobic layer 216 can be further disposed on the dielectric layer 214 to create a hydrophobic surface thereon. The hydrophobic layer 216 can be made of a fluorine-containing hydrophobic polymer or a carbide-containing hydrophobic polymer, with a thickness approximately in a range between 0.1 μm and 1 μm.

A hydrophilic partition structure 222 is disposed on the hydrophobic layer 216, thereby defining an array of multiple sub-pixels. The hydrophilic partition structure 222 can be made of a hydrophilic photoresist with a thickness approximately in a range between 5 μm and 10 μm.

A plurality of non-polar fluid layers 225C, 225Y, 225M, and 225K corresponding to different colors are disposed on the hydrophobic layer 216 of each sub-pixel region. The non-polar fluid layer can be made of decane, dodecane, or tetradecane, with a thickness approximately in a range between 1 μm and 10 μm. Alternatively, the non-polar fluid layers 225C, 225Y, 225M, and 225K include primary colors (such as RGBK or CYMK) of dyes or pigments. A transparent polar fluid 226 is filled between the first substrate 230 and the second substrate 210. The transparent polar fluid layer 226 can be made of water, sodium chloride solution, or potassium chloride solution with a thickness approximately in a range between 30 μm and 250 μm. A seal structure 240 is formed on the peripheral region of the display device encapsulating the first substrate 230 and the second substrate 210. A common electrode 232 contacts the second fluid 226. The common electrode 232 can be made of indium tin oxide (ITO) or indium zinc oxide (IZO) with a thickness approximately in a range between 0.1 μm and 1 μm. The surface of the transparent polar fluid 226 approaches the hydrophobic layer 216 due to electrical field generated between the common electrode 232 and the electrodes 212 in each sub-pixel region. The non-polar fluid is pushed away from the pixel electrodes 212 and becomes cohered, thereby rendering display images. Specifically, whether the ambient light passing through the display device is reflected or absorbed can thus be controlled due to shrink or stretch of the color non-polar fluids in each sub-pixel. Different color sub-pixels can be separately driven to display desirable colors of in each pixel, thereby achieving full-color display effect.

According to an embodiment of the invention, the color electrowetting display device 200 is composed of an array of a plurality of pixels. Each pixel includes multiple (e.g., four) primary color sub-pixels. The shape of the sub-pixel can comprise a rectangular, a hexagonal, a square, a circle, a triangle, a trapezoid, or an ellipse. In one embodiment of the invention, the primary color sub-pixels comprise a black sub-pixel, a red sub-pixel, a green sub-pixel, and a blue sub-pixel. In another embodiment of the invention, the primary color sub-pixels comprise a black sub-pixel, a yellow sub-pixel, a magenta sub-pixel, and a cyan sub-pixel. Each sub-pixel corresponds to a non-polar fluid layer with different colors, and each of the different color non-polar fluid layers is separated from each other. Adjacent sub-pixels have different colors of the non-polar fluid layers.

In a structural embodiment of the color electrowetting display device, a polar fluid and different color non-polar ink oils are filled between the upper and lower substrates, wherein the different color non-polar ink oils are separated by a hydrophilic partition structure. Different color non-polar ink oils in adjacent sub-pixels are consequently composed of an array of sub-pixels. Whether a specific spectrum of the incident light passing through the display device is reflected or absorbed can be control due to shrink or stretch of the color non-polar ink oil, thereby displaying different color lights.

Figure 5A:
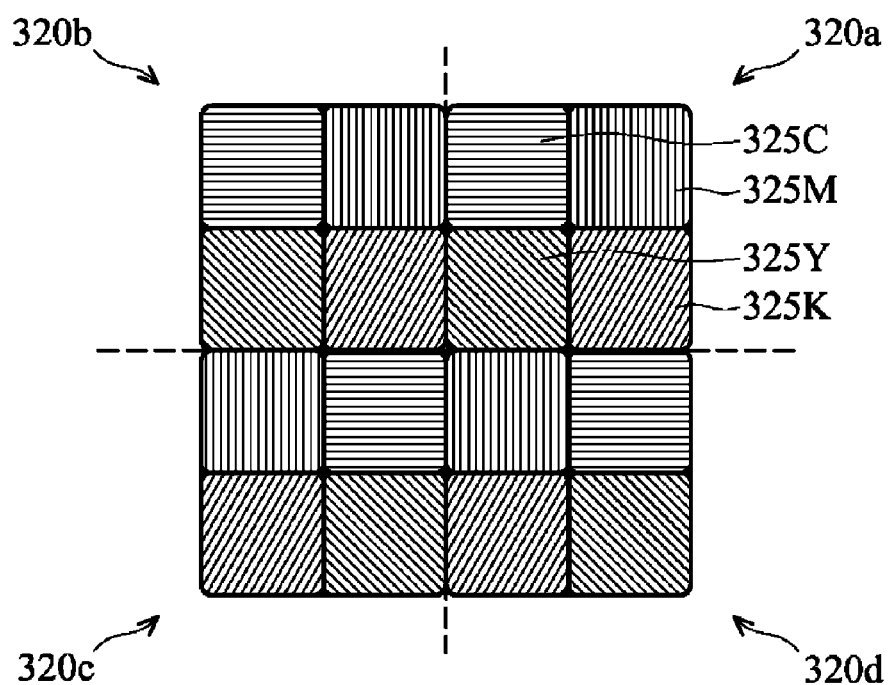
FIGS. 5A-5C are schematic diagrams illustrating color changing of each pixel of an embodiment of the electrowetting display device.
Figure 5B:
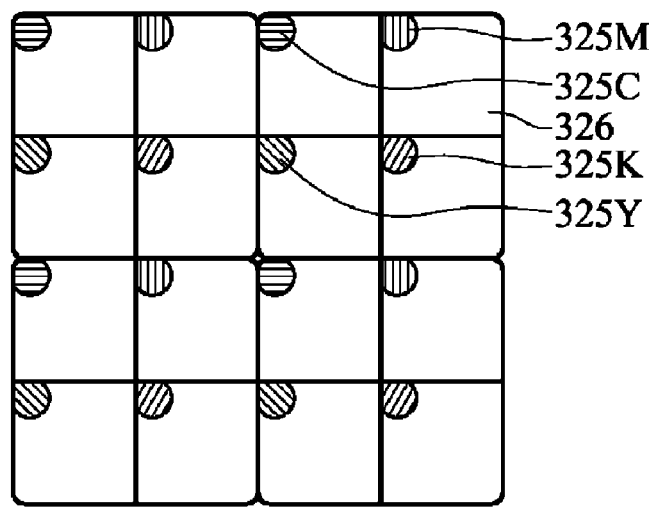
Figure 5C:
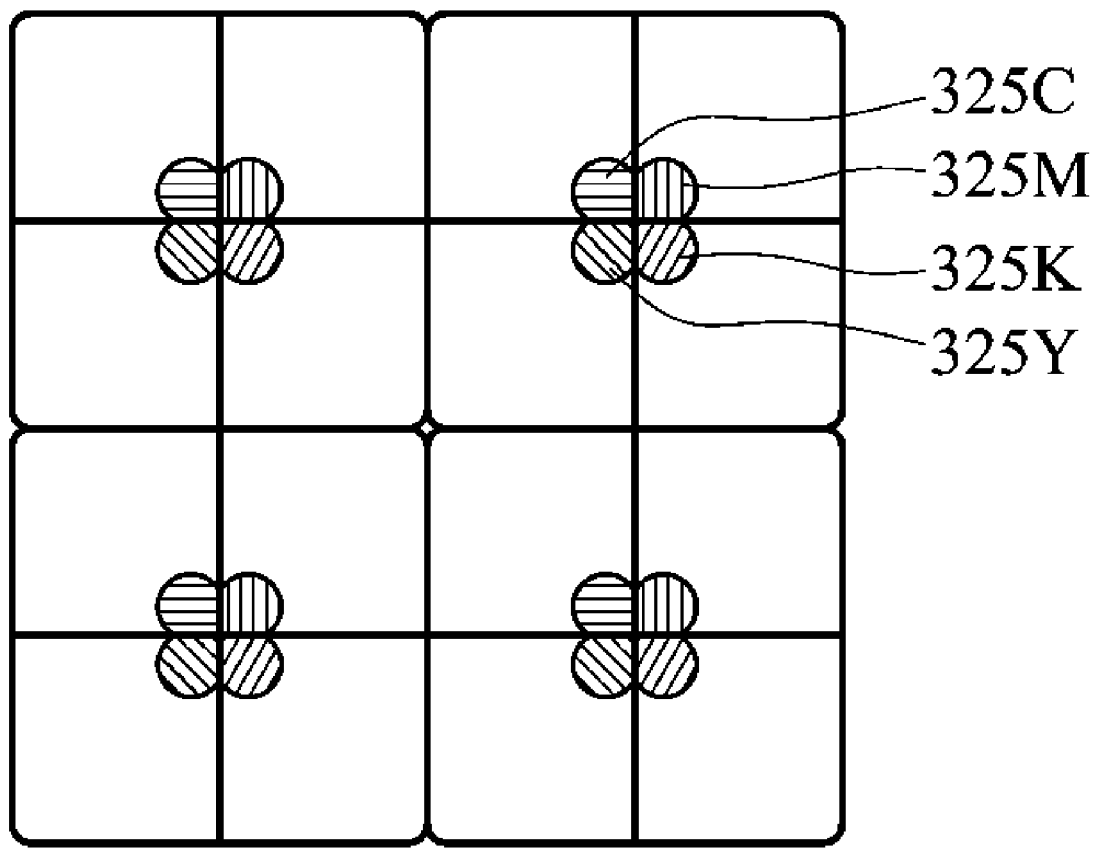

FIGS. 5A-5C are schematic diagrams illustrating color changing of each pixel of an embodiment of the electrowetting display device. Referring to FIG. 5A, the display pixels 320a-320d are arranged in a square array, separately corresponding to a cyan sub-pixel 325C, a yellow sub-pixel 325Y, a magenta sub-pixel 325M, and a black sub-pixel 325K. At a "dark" state, all of the color non-polar ink oils in each color sub-pixel are stretched. When a "bright" state is shown, the color non-polar ink oils in each color sub-pixel are coherently shrank towards the same corer of each sub-pixel, exposing the underlying dielectric layer or reflective plate 326, as shown in FIG. 5B. In another embodiment, when a "bright" state is shown, the color non-polar ink oils in each color sub-pixel are coherently shrank towards common corers among the adjacent sub-pixels, exposing the underlying dielectric layer or reflective plate, as shown in FIG. 5C.

Figure 6A:
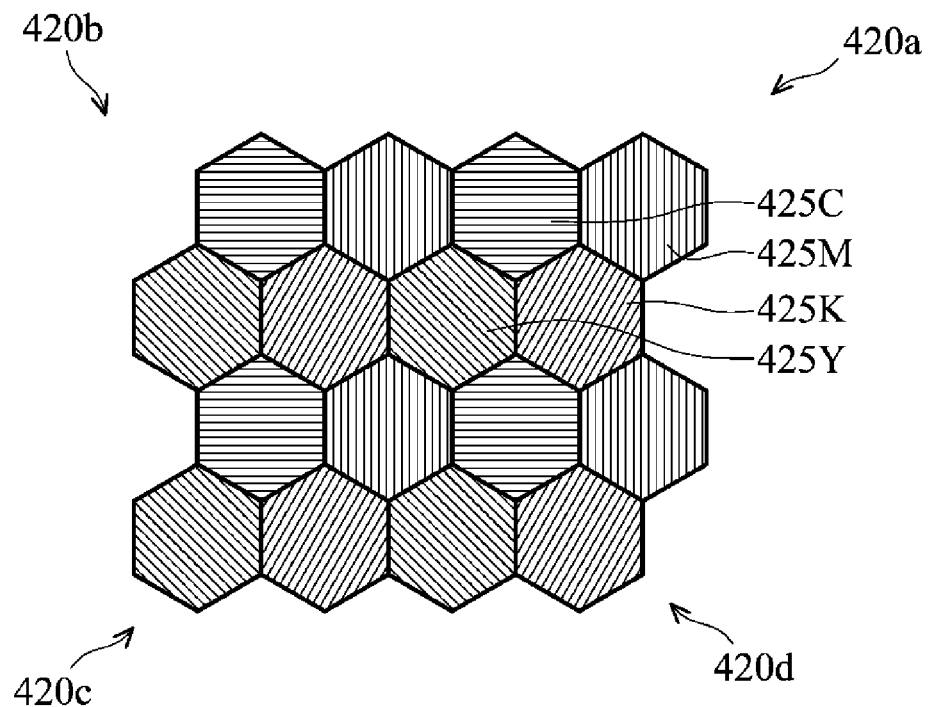
FIGS. 6A-6C are schematic diagrams illustrating color changing of each pixel of another embodiment of the electrowetting display device.
Figure 6B:
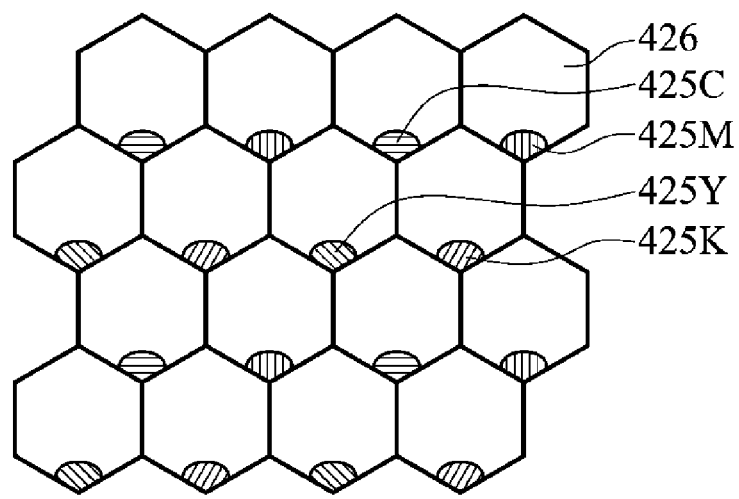
Figure 6C:
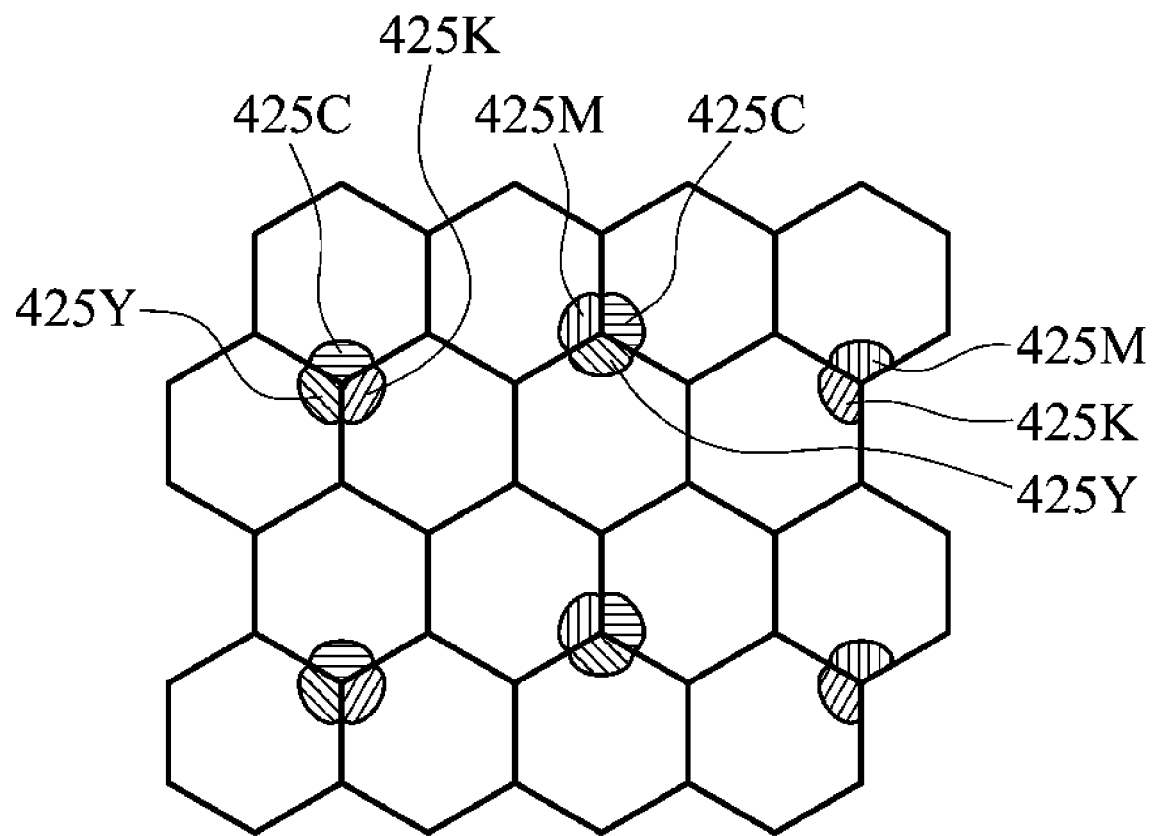

FIGS. 6A-6C are schematic diagrams illustrating color changing of each pixel of another embodiment of the electrowetting display device. Referring to FIG. 6A, the display pixels 420a-420d are arranged in a hexagonal close packed array, separately corresponding to a cyan sub-pixel 425C, a yellow sub-pixel 425Y, a magenta sub-pixel 425M, and a black sub-pixel 425K. At a "dark" state, all of the color non-polar ink oils in each color sub-pixel are stretched. When a "bright" state is shown, the color non-polar ink oils in each color sub-pixel are coherently shrank towards the same corer of each sub-pixel, exposing the underlying dielectric layer or reflective plate 426, as shown in FIG. 6B. In another embodiment, when a "bright" state is shown, the color non-polar ink oils in each color sub-pixel are coherently shrank towards common corers among the adjacent sub-pixels, exposing the underlying dielectric layer or reflective plate, as shown in FIG. 6C.

Figure 7A:
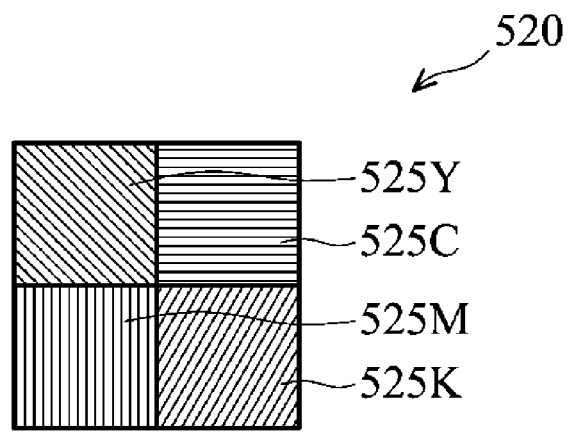
FIGS. 7A-7C are schematic diagrams illustrating color changing of each sub-pixel of another embodiment of the electrowetting display device.
Figure 7B:
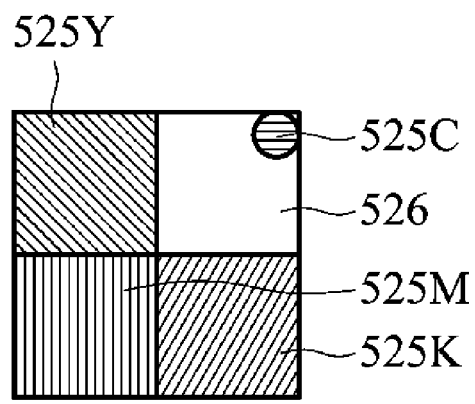
Figure 7C:
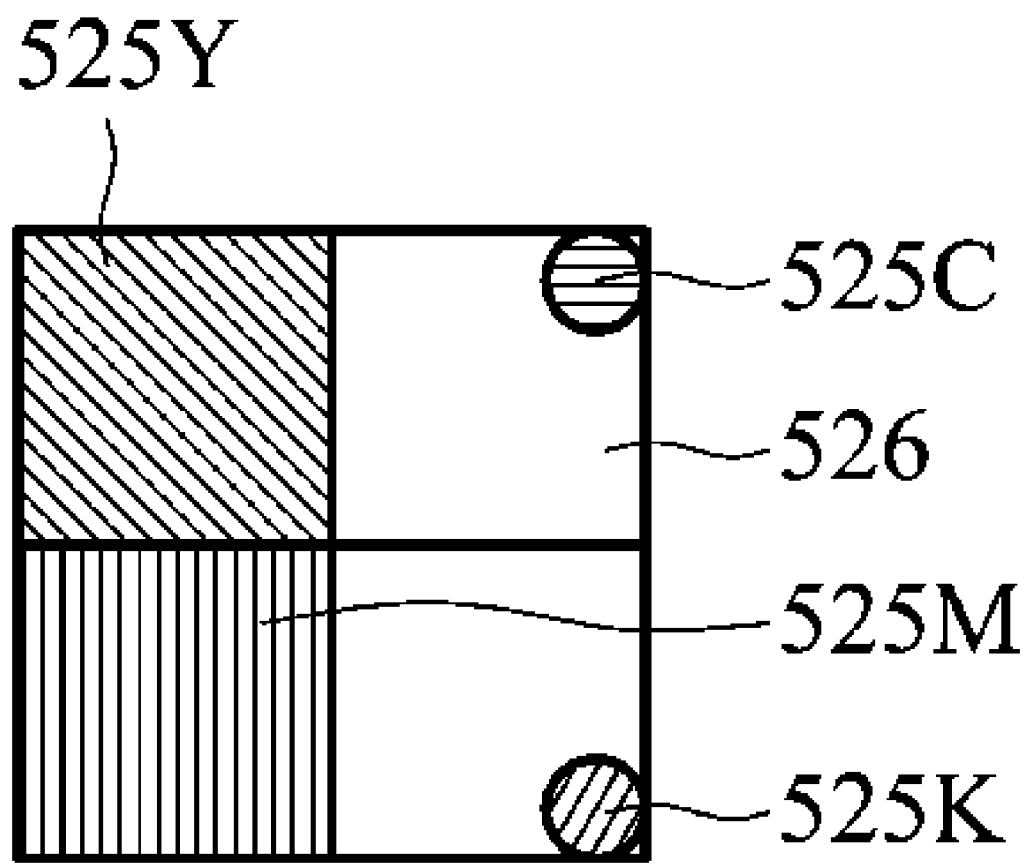

FIGS. 7A-7C are schematic diagrams illustrating color changing of each sub-pixel of another embodiment of the electrowetting display device. Referring to FIG. 7A, at a "dark" state, all of the color non-polar ink oils in each color sub-pixel 525C, 525Y, 525M, 525K, are stretched. Referring to FIG. 7B, when a "dark red" pixel is desirably shown, the cyan sub-pixel 525C is driven, changing distribution of the cyan non-polar ink oil. The entity of the display pixel 520 presents dark red. Referring to FIG. 7C, when a "bright red" pixel is desirably shown, the cyan sub-pixel 525C and the black sub-pixel 525K are driven, changing distribution of the cyan and black non-polar ink oils. The entity of the display pixel 520 presents bright red.

Table I depicts relationships between the CYMK sub-pixels and desirable colors presented by a display pixel. The distribution of non-polar ink oils in each color sub-pixel is presented according to the desirable shown pixel color.

TABLE I

| Present color | Sub-pixel color | | | |
|---|---|---|---|---|
| | Cyan | Yellow | Magenta | Black |
| Cyan | ✓ | | | |
| Dark Cyan | ✓ | | | ✓ |
| Yellow | | ✓ | | |
| Dark Yellow | | ✓ | | ✓ |
| Magenta | | | ✓ | |
| Dark Magenta | | | ✓ | ✓ |
| Black | ✓ | ✓ | ✓ | ✓ |
| Red | | ✓ | ✓ | |
| Dark red | | ✓ | ✓ | ✓ |
| Blue | ✓ | | ✓ | |
| Dark Blue | ✓ | | ✓ | ✓ |
| Green | ✓ | ✓ | | |
| Dark Green | ✓ | ✓ | | ✓ |

Figure 8A:
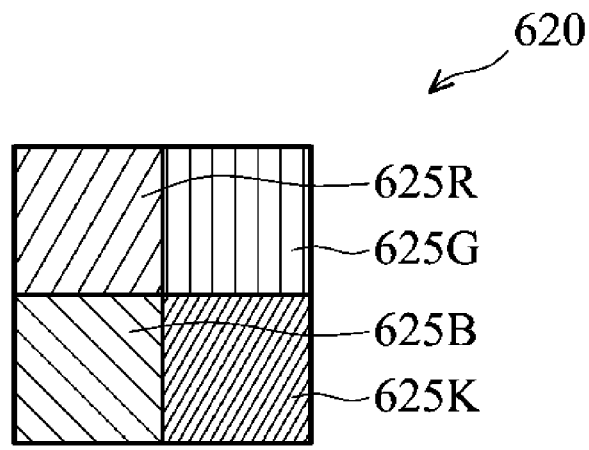
FIGS. 8A-8C are schematic diagrams illustrating color changing of each sub-pixel of another embodiment of the electrowetting display device.
Figure 8B:
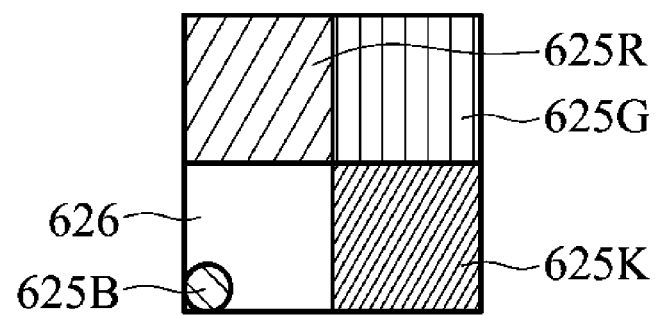
Figure 8C:
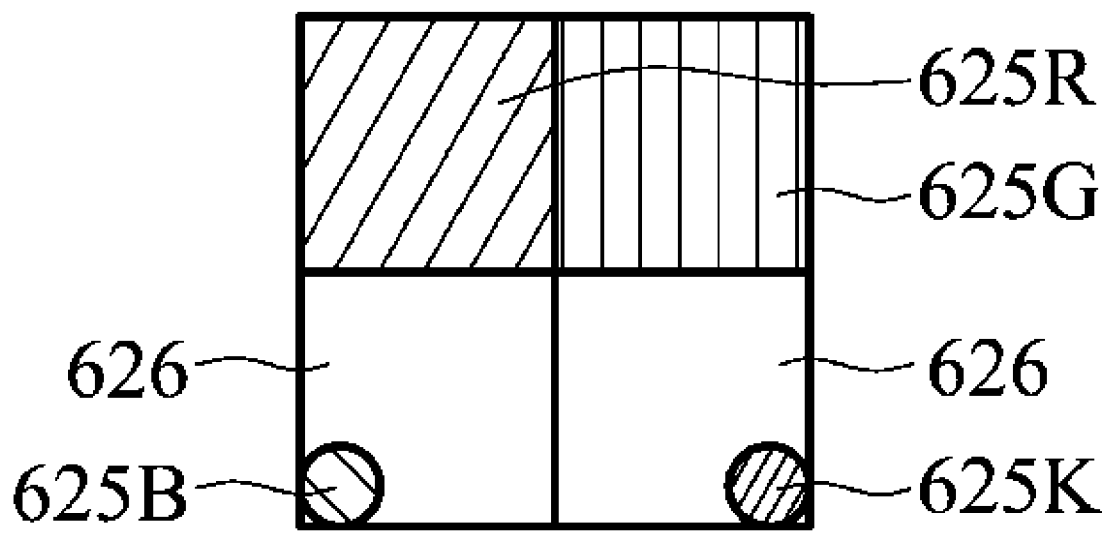

FIGS. 8A-8C are schematic diagrams illustrating color changing of each sub-pixel of another embodiment of the electrowetting display device. Referring to FIG. 8A, at a "dark" state, all of the color non-polar ink oils in each color sub-pixel 625R, 625G, 625B, and 525K in the display pixel 620 are stretched. Referring to FIG. 8B, when a "dark yellow" pixel is desirably shown, the blue sub-pixel 625B is driven, changing distribution of the blue non-polar ink oil. The entity of the display pixel 620 presents dark yellow. Referring to FIG. 7C, when a "bright yellow" pixel is desirably shown, the blue sub-pixel 625B and the black sub-pixel 625K are driven, changing distribution of the blue and black non-polar ink oils. The entity of the display pixel 620 presents bright yellow.

Table II depicts relationships between the RGBK sub-pixels and desirable colors presented by a display pixel. The distribution of non-polar ink oils in each color sub-pixel is presented according to the desirable shown pixel color.

TABLE II

| Present color | Sub-pixel color | | | |
|---|---|---|---|---|
| | Red | Green | Blue | Black |
| Cyan | | ✓ | ✓ | |
| Dark Cyan | | ✓ | ✓ | ✓ |
| Yellow | ✓ | ✓ | | |
| Dark Yellow | ✓ | ✓ | | ✓ |
| Magenta | ✓ | | ✓ | |
| Dark Magenta | ✓ | | ✓ | ✓ |
| Black | ✓ | ✓ | ✓ | ✓ |
| Red | ✓ | | | |
| Dark red | ✓ | | | ✓ |
| Blue | | | ✓ | |
| Dark Blue | | | ✓ | ✓ |
| Green | | ✓ | | |
| Dark Green | | ✓ | | ✓ |

While the invention has been described by way of example and in terms of the several embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A color electrowetting display device, comprising:
a first substrate and an opposing second substrate with a polar fluid layer and a color non-polar fluid layer interposed therebetween;
a first transparent electrode disposed on the first substrate;
a second electrode disposed on the second substrate; and
a hydrophilic partition structure disposed on the second substrate, thereby defining a plurality of sub-pixels;
wherein the color electrowetting display further includes an array of color pixel regions, each pixel region consisting of a set of primary color sub-pixels,
wherein each color sub-pixel corresponds to one of different color non-polar fluid layers, and each of the different color non-polar fluid layers is isolated from each other, and
wherein the colors of non-polar fluid layer in the neighboring sub-pixels are different.

2. The color electrowetting display device as claimed in claim 1, wherein the second transparent electrode is a patterned structure comprising a rectangular, a square, a triangle, a circle, a trapezoid, or an ellipse.

3. The color electrowetting display device as claimed in claim 1, further comprising a dielectric layer disposed on the second transparent electrode.

4. The color electrowetting display device as claimed in claim 3, further comprising a hydrophobic layer disposed on the dielectric layer.

5. The color electrowetting display device as claimed in claim 3, wherein the dielectric layer comprises parylene, $SiO_x$, $SiN_x$, poly(vinyldiene fluoride), $TiO_2$, or $ZrO_2$.

6. The color electrowetting display device as claimed in claim 4, wherein the hydrophobic layer comprises a fluorine-containing hydrophobic polymer or a carbide-containing hydrophobic polymer.

7. The color electrowetting display device as claimed in claim 1, wherein the hydrophilic partition structure comprises a hydrophilic photoresist.

8. The color electrowetting display device as claimed in claim 1, wherein the polar fluid layer comprises water, sodium chloride solution, or potassium chloride solution.

9. The color electrowetting display device as claimed in claim 1, wherein the non-polar fluid layer comprises decane, dodecane, or tetradecane.

10. The color electrowetting display device as claimed in claim 1, wherein the non-polar fluid layer comprises a dye or a pigment.

11. The color electrowetting display device as claimed in claim 1, wherein a shape of the sub-pixel comprises a rectangular, a hexagonal, a square, a circle, a triangle, a trapezoid, or an ellipse.

12. The color electrowetting display device as claimed in claim 1, further comprising a reflective layer disposed on the second substrate.

13. The color electrowetting display device as claimed in claim 12, wherein the reflective layer comprises aluminum, titanium dioxide, or zirconium dioxide.

14. The color electrowetting display device as claimed in claim 1, wherein the primary color sub-pixels comprise a black sub-pixel, a red sub-pixel, a green sub-pixel, and a blue sub-pixel.

15. The color electrowetting display device as claimed in claim 1, wherein the primary color sub-pixels comprise a black sub-pixel, a yellow sub-pixel, a magenta sub-pixel, and a cyan sub-pixel.

16. The color electrowetting display device as claimed in claim 1, wherein during operation, the non-polar fluid layers of each of adjacent sub-pixels are cohered towards adjacent corners among the adjacent sub-pixels.

17. A color electrowetting display device, comprising:
a first substrate and an opposing second substrate with a polar fluid layer and a color non-polar fluid layer interposed therebetween;
a first transparent electrode disposed on the first substrate;
a second electrode disposed on the second substrate; and
a hydrophilic partition structure disposed on the second substrate, thereby defining a plurality of sub-pixels;
wherein the color electrowetting display further includes an array of color pixel regions, each pixel region consisting of a black sub-pixel and a set of primary color sub-pixels,
wherein each color sub-pixel corresponds to one of different color non-polar fluid layers, and each of the different color non-polar fluid layers is isolated from each other, and
wherein the colors of non-polar fluid layer in the neighboring sub-pixels are different.

18. The color electrowetting display device as claimed in claim 17, wherein the second transparent electrode is a patterned structure comprising a rectangular, a square, a triangle, a circle, a trapezoid, or an ellipse.

19. The color electrowetting display device as claimed in claim 17, further comprising a dielectric layer disposed on the second transparent electrode.

20. The color electrowetting display device as claimed in claim 19, further comprising a hydrophobic layer disposed on the dielectric layer.

21. The color electrowetting display device as claimed in claim 19, wherein the dielectric layer comprises parylene, $SiO_x$, $SiN_x$, poly(vinyldiene fluoride), $TiO_2$, or $ZrO_2$.

22. The color electrowetting display device as claimed in claim 20, wherein the hydrophobic layer comprises a fluorine-containing hydrophobic polymer or a chlorine-containing hydrophobic polymer.

23. The color electrowetting display device as claimed in claim 17, wherein the hydrophilic partition structure comprises a hydrophilic photoresist.

24. The color electrowetting display device as claimed in claim 17, wherein the polar fluid layer comprises water, sodium chloride solution, or potassium chloride solution.

25. The color electrowetting display device as claimed in claim 17, wherein the non-polar fluid layer comprises decane, dodecane, or tetradecane.

26. The color electrowetting display device as claimed in claim 17, wherein the non-polar fluid layer comprises a dye or a pigment.

27. The color electrowetting display device as claimed in claim 17, wherein a shape of the sub-pixel comprises a rectangular, a hexagonal, a square, a circle, a triangle, a trapezoid, or an ellipse.

28. The color electrowetting display device as claimed in claim 17, further comprising a reflective layer disposed on the second substrate.

29. The color electrowetting display device as claimed in claim 28, wherein the reflective layer comprises aluminum, titanium dioxide, or zirconium dioxide.

30. The color electrowetting display device as claimed in claim 17, wherein the primary color sub-pixels comprise a red sub-pixel, a green sub-pixel, and a blue sub-pixel.

31. The color electrowetting display device as claimed in claim 17, wherein the primary color sub-pixels comprise a black sub-pixel, a yellow sub-pixel, a magenta sub-pixel, and a cyan sub-pixel.

32. The color electrowetting display device as claimed in claim 17, wherein during operation, the non-polar fluid layers of each of adjacent sub-pixels are cohered towards adjacent corners among the adjacent sub-pixels.

* * * * *